G. A. TAYLOR.
TWIST DRILL.
APPLICATION FILED AUG. 24, 1917.

1,309,706.

Patented July 15, 1919.

INVENTOR
George A. Taylor
by MacLeod, Colver, Copeland + Dike
Attys

UNITED STATES PATENT OFFICE.

GEORGE A. TAYLOR, OF HYDE PARK, MASSACHUSETTS.

TWIST-DRILL.

1,309,706.  Specification of Letters Patent.  Patented July 15, 1919.

Application filed August 24, 1917. Serial No. 187,966.

*To all whom it may concern:*

Be it known that I, GEORGE A. TAYLOR, a citizen of the United States, residing at Hyde Park, county of Suffolk, State of Massachusetts, have invented a certain new and useful Improvement in Twist-Drills, of which the following is a specification, reference being had therein to the accompanying drawings.

My invention has for its object a new and improved drill with two or more cutting edges for use in the manufacture of metal articles. The particular object of the invention is to produce a drill of the character mentioned which can be driven at higher speed and fed more rapidly than drills now in use. Incidentally the invention has for its object to lessen the amount of power necessary to turn the drill in the hole and to feed it accurately; to make a drill which will drill a hole to size more accurately; to make a drill which will have less tendency to wabble or run as the drilling takes place and to make a drill which will be more durable.

As is well known to those skilled in this art the speed at which the drill may be driven is limited. If the drill is driven above this speed, it becomes heated high enough to affect the temper of the drill. It is also well known that the life of the drill depends to some extent on the speed with which it is driven and fed, that is the number of holes which can be drilled by it before the drill acquires sharpening will be somewhat greater if the drill is run slowly than if the drill is run and fed at maximum speed.

For the purpose of making clearer the nature of my invention, it may be stated that heretofore it has been customary to make a drill with the angle between the axis of rotation and the cutting edge 59° this being the standard adopted by twist drill makers. The cutting edge is straight and the clearance is formed by grinding the drill in the manner shown in Letters Patent of the United States No. 270,366 to Bancroft and Thorne, Jan. 9, 1883. Drills ground in this manner have a portion or point at the center which constitutes what is known as the dead metal and which if not absolutely symmetrical with the axis of rotation will produce unequal pressure on the two sides of the axis and cause the drill to run, that is, to diverge from a straight line in drilling the hole.

My invention consists in giving to the cutting end of the drill a certain novel shape by which the speed of drilling may be more than doubled and the life of the drill materially increased. This surprising result is obtained solely by the shape given to the point and cutting edge of the drill. To make my invention more clear, it may be explained that the ordinary twist drill has a straight cutting edge which may be considered to be composed of a number of units of length. The ground surface behind the cutting edge is conical as indicated in the Bancroft and Thorne patent already referred to. The amount of work which a unit of length of the cutting edge which lies near the axis of rotation does is very small as compared with the amount of work done by the unit length of edge which lies farthest away from the axis of rotation since the work done is practically proportional to the length of the arc through which a given point travels. Therefore, the speed of such a drill is limited by the speed at which the outer corner can travel without over heating. I also believe that this depends upon the capacity of the metal behind the cutting edge to carry off the heat generated by the adjacent portion of the edge.

In the drill embodying my invention the edge of the dead metal is connected with the front edge of the land by a convex curve so shaped that the amount of metal removed by a unit of length of edge near the axis of rotation is equal to or more than the amount removed by a unit of length of edge farther from the axis of rotation. In other words, the cutting edge at the outer corner is lengthened by the curvature given to it so that the work of removing the metal is distributed along a greater length of edge and the heat generated is distributed instead of being concentrated.

The invention will be fully understood from the following description when taken in connection with the accompanying drawings and the novel features thereof will be pointed out and clearly defined in the claims at the close of this specification.

In the drawings, Figure 1 is a side elevation of the point of a drill embodying my invention.

Figure 3:
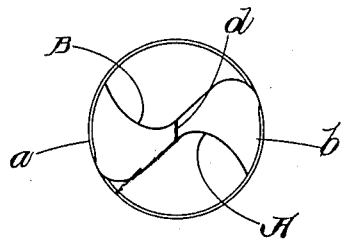
Fig. 3 is a plan view of the point of the drill shown in Figs. 1 and 2.
Figure 1:
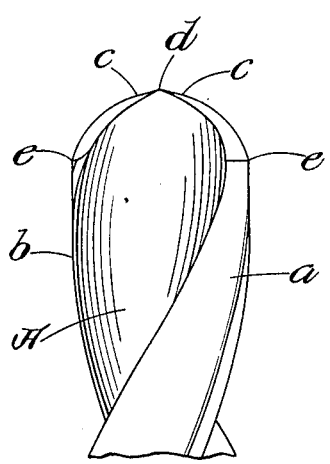
Figure 2:
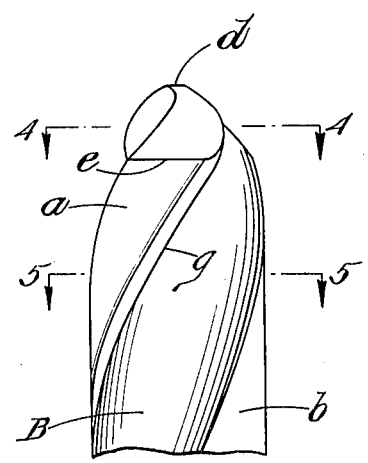
Fig. 2 is a similar side elevation the drill being turned through an angle of 90° from the position shown in Fig. 1.
Figures 4, 5, 6:
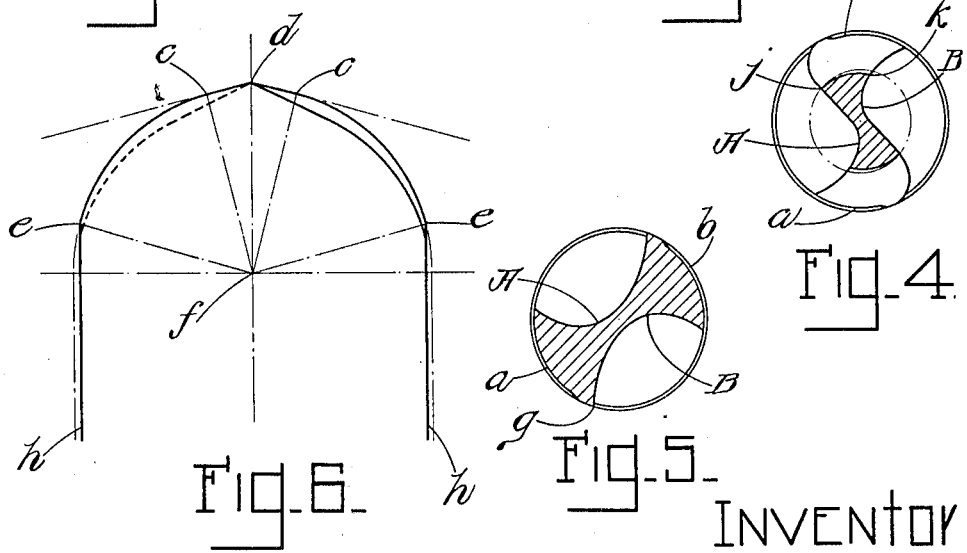
Fig. 4 is a section on line 4—4 of Fig. 2.
Fig. 5 is a section on line 5—5 of Fig. 2.
Fig. 6 is a diagram showing the manner in which the drill embodying my invention is ground.

Referring now to the drawings which show what I consider to be the best embodiment of my invention, at A and B are shown the flutes of an ordinary twist drill the lands being shown at $a$ and $b$ (see particularly Figs. 3 and 5). In this form of drill these parts are identical with drills heretofore commonly employed. The portion of the edge at the point between the points $c$ and $d$ (see Figs. 1 and 6) lies in a cone the axis of which is coincident with the axis of rotation of the drill. The portion of the edge from the point $c$ to the point $e$ is curved. This portion of the edge may be said to connect the front edge $g$ of the land $a$ with the edge of the dead metal near the point of the drill. The ground surface of the point behind the edge of the drill has a curvature such that the section of it lying in a vertical plane passing through the axis will be the arc of a circle. This will be clearly understood from the diagram forming Fig. 6. The shape of the ground portion of the point will also be more easily understood by reference to Fig. 4 which shows a section taken on line 4—4 of Fig. 2 and in which the line $jk$ shows the edge of the section and how the necessary clearance is obtained.

The angle made by the two lines $cd$ and $dc$ is preferably about 150°. The portion from $c$ to $e$ is the arc of a circle about a center $f$ lying on the axis of rotation, said circle having a radius greater than the radius of the drill. The line $dc$ is tangent to the line $ce$, but the line $ce$ is not tangent to the line $eh$ forming the side of the drill. It will be seen that the curve $ce$ formed by the plane passing through the axis of the drill lies within the angle between the axis of the drill and the line $cd$ which line may be conveniently termed an extension of the line of the dead metal.

Grinding to the form described may be accomplished conveniently by an especially designed machine which will move the drill with relation to the grinding wheel in such a manner as to produce the surface required. Such a machine forms the subject of an application to be filed by me hereafter.

When the drill is ground as described, it will be found that the point or cutting edge of the drill is practically straight from $c$ to $d$ and is convexly curved from that point to the point at the junction with the edge of the land. It will also be seen that the cutting edge is nearly vertical at the point of junction with the land.

By this construction the work of removing the metal, that is, the cutting, is distributed along the entire length of the cutting edge in such a manner that a unit of length of edge at the periphery does no more work than a unit of length of edge nearer the axis and therefore that the amount of heat produced in removing the metal is more nearly uniform for each unit of length of the cutting edge since a unit near the periphery is traveling faster than those nearer the axis. The result is that there is no tendency to heat the outer part of the cutting edge more than the central part. Furthermore the grinding is such that the amount of metal behind the respective portions of the cutting edge and therefore the speed with which the heat is generated will be carried off is substantially uniform. It is further to be understood that the cutting edge has a draw-cutting action which tends to increase the effectiveness of the drill.

The advantages resulting from the more even distribution of the work throughout the entire length of the cutting edge are at once apparent. The axial thrust is decreased and therefore the actual thrust necessary to force the drill into the metal is reduced. The difficulties resulting from any imperfect grinding resulting in lack of symmetry are diminished. The drill cuts a smoother hole because of the draw-cutting action at the periphery of the drill, the hole is more nearly true to size and the drill may be more easily withdrawn.

In the accompanying drawings and following description a drill is shown and described which embodies my invention in the form which I believe to be the best but I do not limit myself to this construction except as may be required by the scope of the appended claims, since I believe myself to be the first to construct a drill of the character described, and, therefore, I consider my invention of a basic character.

What I claim is:

1. The improved drill for metal work having a cutting edge which is a convex curve, one end being at or near the dead metal and the other end being nearly tangent to the front edge of the land.

2. The improved drill for metal work having a cutting edge which is a convex curve, the point of said drill being so formed that the curve of the edge of a section formed by a plane including the axis of the drill is a curve lying within the angle between the axis and the line in that plane which is an extension of the line of the dead metal, and in each plane at right angles to the axis, a curve is formed the rear end of which is nearer the axis than the front end.

3. The improved drill for metal work having a cutting edge which adjacent the point of the drill is a straight line and thence is a curve joining the front edge of the land.

In testimony whereof I affix my signature.
GEORGE A. TAYLOR.

Copies of this patent may be obtained for five cents each, by addressing the "Commissioner of Patents, Washington, D. C."